United States Patent
Muschke et al.

(10) Patent No.: US 8,585,370 B2
(45) Date of Patent: Nov. 19, 2013

(54) ROTOR BLADE, ROTOR BLADE ELEMENT AND PRODUCTION PROCESS

(75) Inventors: Sven Muschke, Schortens (DE); Torsten Link, Norden (DE)

(73) Assignee: Aloys Wobben, Aurich (DE)

(*) Notice: Subject to any disclaimer, the term of this patent is extended or adjusted under 35 U.S.C. 154(b) by 0 days.

(21) Appl. No.: 13/276,994

(22) Filed: Oct. 19, 2011

(65) Prior Publication Data

US 2012/0093659 A1     Apr. 19, 2012

Related U.S. Application Data

(63) Continuation of application No. PCT/EP2010/054835, filed on Apr. 13, 2010.

(30) Foreign Application Priority Data

Apr. 20, 2009   (DE) .................. 10 2009 002 501

(51) Int. Cl.
    *F01D 5/14*     (2006.01)
(52) U.S. Cl.
    USPC .................. 416/226; 416/230; 416/241 A
(58) Field of Classification Search
    USPC ....... 29/889.71; 416/223 R, 226, 229 R, 230, 416/241 R, 241 A; 264/36.22, 264, 266
    See application file for complete search history.

(56) References Cited

U.S. PATENT DOCUMENTS

| 6,206,067 | B1 | 3/2001 | Kociemba et al. |
| 7,473,385 | B2* | 1/2009 | Stiesdal et al. ............... 264/314 |
| 7,794,209 | B2 | 9/2010 | Wobben .................... 416/223 R |
| 7,927,077 | B2* | 4/2011 | Olson ........................ 416/229 R |
| 7,946,803 | B2 | 5/2011 | Wobben ....................... 415/4.3 |
| 8,088,237 | B2* | 1/2012 | Haywood ........................ 156/94 |
| 2006/0027314 | A1* | 2/2006 | Jones et al. ................... 156/245 |
| 2007/0117947 | A1 | 5/2007 | Wehner ............................ 528/44 |
| 2007/0251090 | A1* | 11/2007 | Breugel et al. ................ 29/889.7 |
| 2009/0229747 | A1* | 9/2009 | Olson et al. ................... 156/305 |
| 2010/0135820 | A1 | 6/2010 | Olson |

FOREIGN PATENT DOCUMENTS

| EP | 1625929 | 2/2006 |
| JP | 2009-275536 A | 11/2009 |
| WO | 2005/120794 | 12/2005 |
| WO | 2006/066593 | 6/2006 |
| WO | 2007/048141 A2 | 4/2007 |

* cited by examiner

*Primary Examiner* — Edward Look
*Assistant Examiner* — Liam McDowell
(74) *Attorney, Agent, or Firm* — Seed IP Law Group PLLC

(57) ABSTRACT

A rotor blade or rotor blade element for a wind power installation is provided having a surface film and a hardenable resin, wherein the surface film has been reacted with the resin to form an integral portion of the rotor blade or rotor blade element. Production and repair processes for the rotor blade or the rotor blade element are also provided.

4 Claims, 1 Drawing Sheet

ROTOR BLADE, ROTOR BLADE ELEMENT AND PRODUCTION PROCESS

CROSS-REFERENCE TO RELATED APPLICATIONS

This application is a continuation application of International Application No. PCT/EP2010/054835, accorded an International Filing Date of Apr. 13, 2010, which claims priority to German Application No. 10 2009 002 501.4 filed Apr. 20, 2009. Each of these applications is hereby incorporated herein by reference in its entirety.

BACKGROUND

1. Technical Field

The present disclosure concerns a rotor blade and a rotor blade element for a wind power installation, the rotor blade itself and production processes for the rotor blade element and the rotor blade, including repair processes.

2. Description of the Related Art

Rotor blades for wind power installations have long been known and described for example in DE 10 2004 007 487 A1 and DE 103 19 246 A1. In operation thereof, they are subjected to high levels of loading due to wind pressure, erosion, temperature fluctuations, UV "Ultraviolet" irradiation and precipitation. At the same time the rotor blades however should be as light as possible to keep down the flexural loads acting on a rotor blade hub which is possibly provided, as well as the associated bearings and the pylon of the wind power installation. It has proven to be desirable to produce rotor blades from individual elements and to interconnect those elements to form a hollow chamber-like rotor blade. The rotor blade elements used are usually a rotor blade pressure side, a rotor blade suction side and one or more connecting limbs for connecting and stiffening the rotor blade pressure and suction sides. It has also proven desirable for the rotor blade pressure side and the rotor blade suction side to be produced in one piece and in that production to already arrange limbs at their required locations.

Rotor blades and rotor blade elements are usually produced in a shaping process in which fiber materials and/or core materials, in particular balsa wood, are introduced into a rotor blade element mold and acted upon with a hardening resin to form a composite material which can be subjected to loadings in the above-indicated sense. In that respect it is desirable for the resin to be used as an infusion resin in a vacuum infusion process. Production processes for such composite elements are described, for example, in DE 103 44 379 A1, the content of which is entirely incorporated into this description by reference thereto. In such an infusion process a mold release agent, for example a mold release film or a separating agent, is firstly introduced into a production mold. Fiber materials, for example glass fiber layers, are deposited thereon, and covered with a vacuum film. The vacuum film is sealed off along the edges of the production mold. A reduced pressure, sometimes also referred as a "vacuum", is produced between the vacuum film and the production mold by sucking air out of the fiber material. At the same time a hardenable infusion resin is sucked from a supply into the region subjected to the reduced pressure in order to impregnate the fiber material and to be uniformly distributed therein. In that respect particular care must be taken to ensure that the fiber material is impregnated as completely as possible to avoid stability-reducing gas inclusions and micropores. The attempt is usually made to promote uniform impregnation of the fiber material with the infusion resin through a plurality of feed conduits for the hardenable infusion resin. The hardenable infusion resin is also subjected to a hardening reaction in the production mold in order to combine with the fiber material to afford a strong composite element. Optionally the composite element can be further hardened after removal from the production mold.

A disadvantage with known shaping processes like that described hereinbefore is that particular precautions have to be taken for removal of the molding from the mold in order to prevent the hardened composite element from adhering to the mold or to permit detachment of the composite element from the mold without serious damage to the surface of the molded composite element. Prior to the present invention, for example, mold release coatings had to be used for that purpose on the molds employed and/or the molds had to be lined prior to insertion of the fiber material with a mold release film or the like which after the molding operation had to be detached from the molded composite element and disposed of Mold release films and the use thereof are described for example in the handbook "Faserverbundbauweisen: Fertigungsverfahren mit duroplastischer Matrix", Springer Verlay, 1999, under the keyword "Trennfolien". In addition, films are required as vacuum films. Those films cover the fiber material and prevent the entry of air during the hardening resin infusion step. The vacuum films also had to be removed from the rotor blade or rotor blade element after the infusion procedure. In addition, a composite element produced in the vacuum infusion process has micropores at its surface and in its interior. In particular micropores at the surface of a rotor blade or rotor blade element are detrimental as they produce unevennesses which can form attack locations for weather influences and thus reduce the durability of the surface. Similarly, micropores in the interior of a rotor blade element or a rotor blade can also reduce the durability and/or stability of the rotor blade or rotor blade element. It is therefore frequently necessary to close micropores by a pore filler before the hardenable infusion resin has completely hardened. It is also frequently necessary to post-work the surface to close micropores arranged there.

To form a surface which is as durable as possible and resistant to weather influences and erosion, the attempt has been made to use a surface layer with a gel coat process as described in DE 103 44 379 A1. A disadvantage in that respect is that with such a process it is necessary to observe a maximum processing time until the gel coat mixture has fully reacted to such an extent that it can be coated with fiber material. That leads to an unwanted reduction in the speed of the production process for a rotor blade or rotor blade element. In addition, after introduction of the gel coat mixture further operation must be implemented without delay to permit reaction of the infusion resin with the partially hardened gel coat mixture. If the waiting period after expiry of the pot time is excessively long then the infusion resin and the gel coat surface layer are not sufficiently joined together so that the durability of the rotor blade element or rotor blade produced in that way is reduced. It is therefore not possible to interrupt the production of a rotor blade element or rotor blade just as desired when using a gel coat process; the production of a rotor blade element or rotor blade thus becomes undesirably inflexible. There is also the disadvantage that, depending on the gel coat mixture employed, the choice of the mold release agent is limited. If the mold release agent and the gel coat mixture are not compatible with each other, surface flaws are formed. In addition, in production of a gel coat mixture it is not possible to exclude the possibility that the constituents thereof are inadequately mixed. That results in an unevenly structured surface with flaws, at which, for example, a paint or lacquer cannot sufficiently adhere. Such flaws have to be dressed by hand which is a complicated and expensive procedure to avoid the early occurrence of paint detachment phenomena. Added to that is the fact that the gel coat mixtures are fluid so that upon being introduced into the production mold they have a tendency to flow down therein. To ensure a thickness, which is adequate at every location, for a surface layer produced using the gel coat process, it is therefore necessary to use an excess of gel coat mixture. However a surface layer produced using the gel coat process cannot be of uniform thickness at every location on a rotor blade or rotor blade element.

The above-mentioned production processes are highly time-consuming and cause environmental pollution due to the materials used therein, in particular the surface coatings and the mold release films which are used as disposable articles. Moreover post-treatment of the surface of the composite element is frequently necessary, in particular the surface of a rotor blade or rotor blade element, to level out for example surface edges and grooves caused by mold release films or to repair surface damage which occurs upon removal of the composite element from a mold with a faulty mold release layer. Residues of the mold release agent on the surface of a rotor blade or rotor blade element, which can occur particularly when using mold release coatings instead of mold release films, also have to be removed by hand in a complicated and expensive procedure and the resulting surface flaws have to be repaired.

BRIEF SUMMARY

Having regard to that background, embodiments of the present invention serve to eliminate or reduce the above-described disadvantages. Further advantages of embodiments of the invention will be expressly described in the further course of this description including the examples or will be apparent to the person having ordinary skill in the relevant art.

According to one embodiment, a rotor blade element for a wind power installation may be summarized as including a rotor blade structure having a surface formed of a surface film and a hardenable resin, wherein the surface film has been reacted with the resin to form an integral portion of the rotor blade structure.

According to another embodiment, a process for the production of a rotor blade element of a wind power installation may be summarized as including: providing a mold; introducing a surface film into the mold; introducing a molding body into the mold; infusing the molding body with a hardenable resin; and hardening the resin so that the reaction of the surface film and the resin form an integral surface of the rotor blade element.

According to another embodiment, a process for the production of a rotor blade element of a wind power installation may be summarized as including: providing a mold; providing a mold release agent; introducing a molding body into the mold; applying a surface film; infusing the molding body with a hardenable resin; and hardening the resin so that the reaction of the surface film and the resin form an integral surface of the rotor blade element.

According to yet another embodiment, a repair process for a rotor blade element of a wind power installation may be summarized as including: providing a fiber material at a rotor blade element; covering the fiber material with a surface film; drawing gas out of the fiber material; acting on the fiber material with a hardenable resin; and reacting the hardenable resin with the surface film.

DETAILED DESCRIPTION

Figure 1:
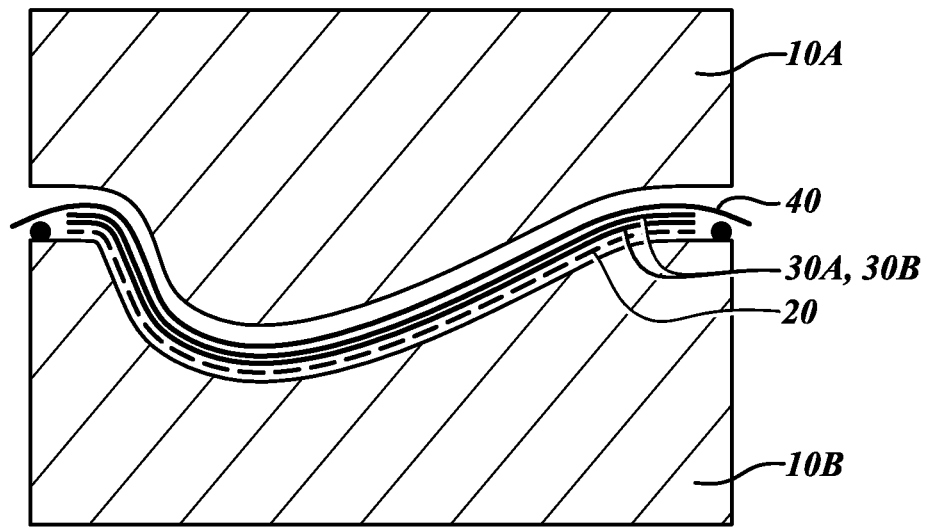
FIG. 1 is a schematic diagram of a rotor blade element formed via a two-part closable rotor blade mold, according to one embodiment.

In accordance with embodiments of the present invention, there are provided a rotor blade and a rotor blade element having a surface film and a hardenable resin, wherein the resin and the surface film have reacted with each other.

Admittedly, rotor blades or rotor blade elements with films arranged on the surface thereof are basically known. Those films however can either be removed from the rotor blade or rotor blade element, such as for example a vacuum or mold release film, or they have not reacted with the resin to form a rotor blade element, but rather like an erosion protection film are stuck on the rotor blade or the rotor blade element or are subsequently possibly releasably fixed to the rotor blade or rotor blade element in some other fashion. In accordance with embodiments of the invention, however, it is possible to avoid the adhesive for joining the surface film to the resin or to the fiber material respectively. As, according to experience, adhesives can fail during the operation of a rotor blade or rotor blade element of a wind power installation, and the erosion protection film is then partially or entirely detached from the rotor blade or rotor blade element, embodiments of the invention make it possible to eliminate that source of fault. Added to that is the fact that films which are stuck on like erosion protection films have an edge at which the film ends and the rest of the rotor blade or rotor blade element is exposed. Weather influences can easily attack at those edges and lead to damage to the film and a reduction in its service life. Moreover erosion protection films also do not serve for shaping of the rotor blade or the rotor blade element, but are provided in relation to wear and do not have to satisfy the above-described demands made on rotor blades and rotor blade elements. Therefore, for shaping a rotor blade or rotor blade element, the person having ordinary skill in the art does not direct his attention to such films which are subsequently glued onto the rotor blade or rotor blade element, when in its finished shaped condition. In accordance with embodiments of the present invention the term surface film is used to denote such a film which after at least partial hardening of the hardenable resin, has reacted with the resin in such a way that it can no longer be removed from the resin without destroying the film and/or the resin; in accordance with embodiments of the invention it is then non-releasably ("integrally") joined to the resin. That can preferably be checked by determining the adhesion pull-off value as described hereinafter. Desirably surface films do not have any coating which hinder or prevent reaction of the resin with the film.

The rotor blade or rotor blade element according to embodiments of the invention has a series of advantages in particular in its production. In particular with a suitable choice of the film material it is possible to dispense with special mold release films or separating agents for a mold which is possibly used for the production of the rotor blade or rotor blade element. Embodiments of the invention further make it possible to dispense with vacuum films in the production of rotor blades and rotor blade elements. That provides a saving on numerous steps when molding rotor blades and rotor blade elements, in particular introducing and checking the inserted vacuum and/or mold release film as well as separation and disposal of the vacuum and/or mold release film from the molded rotor blade or rotor blade element and a surface post-treatment which is otherwise possibly necessary, for example, to deal with surface flaws such as grooves or edges caused by a mold release film. Embodiments of the invention therefore surprisingly permit speeding-up of the production process for rotor blades and rotor blade elements as well as a reduction in production costs. Furthermore a rotor blade element or rotor blade according to embodiments of the invention can be produced in micropore-free fashion at its surface provided with the surface film without the need to use a pore filler for that purpose. The freedom from micropores leads to an advantageously improved resistance to weathering and erosion in comparison with conventional rotor blade elements and rotor blades. In addition, a rotor blade element or rotor blade according to embodiments of the invention has a surface layer which is of uniform thickness and which is formed by the surface film and the thickness of which, as described in greater detail hereinafter, does not fluctuate greatly on small areas, as would be repeatedly observed in relation to the applied liquids in gel coat processes.

It was particularly surprising that it is possible to find any films at all, which satisfy the high demands described in the opening part of this specification in respect of rotor blades and rotor blade elements and which at the same time can react with the hardenable resin to form a rotor blade element or rotor blade. That was unexpected in particular for the reason that hitherto the technical field of the invention only used disposable and wear films of low durability measured in relation to the total service life of a rotor blade or rotor blade element, in particular vacuum films, mold release films and erosion protection films. In addition, the person having ordinary skill in the art had to consider that the material properties of the surface film are modified by the reaction of the resin with the surface film. Having regard to the desired long service life of the rotor blade or rotor blade element, it seemed to the person having ordinary skill in the art both as excessively risky and as promising too little chances of success to in any way investigate in greater detail the use of surface films for the production of molded rotor blades or rotor blade elements.

The surface film and the resin are chemically reacted with each other and are not merely joined together by physical actions, such as, for example, adhesion or by reduced pressure. The reaction preferably involves the formation of covalent bonds between film material and hardened or hardenable resin. The surface film is non-releasably connected ("integrally") to the rotor blade by the reaction as described above. Suitable materials for surface films and resins are described in greater detail hereinafter.

In particularly preferred embodiments of the invention the rotor blade or rotor blade element includes a fiber material impregnated with a resin which hardenable or which is hardened in the finished rotor blade element or rotor blade. A preferred fiber material is glass fibers and/or carbon fibers. Besides the fiber material the rotor blade or rotor blade element can also include further core materials as structure bodies, for example birch and/or balsa wood elements and/or foam bodies. Insofar as reference is made in this description, the examples and the claims, to a rotor blade or rotor blade element, that also means a rotor blade or rotor blade element which contains fiber material and which is impregnated with the resin, insofar as the context does not expressly indicate otherwise. An advantage of such fiber material-bearing rotor blades and rotor blade elements is their stability with low weight. Their good moldability before the resin has hardened is also advantageous.

The rotor blade element according to embodiments of the invention for a wind power installation is preferably a limb, a rotor blade outer shell and parts thereof, in particular a half-shell for the pressure side (also referred to as the rotor blade pressure side) or the suction side (also referred to as the rotor blade suction side), a rotor blade leading edge, a rotor blade trailing edge, a rotor blade tip, a spar flange, an adhesive angle member, a flange reinforcement, an internal reinforcement for abutment means, a ballast chamber or a balance chamber. Rotor blade elements which are particularly preferred according to embodiments of the invention are half-shells of the suction and pressure sides.

Such rotor blade elements are in part of large dimensions. That imposes additional demands on the surface film as numerous film materials are conventionally not commercially available in adequate sizes. Particularly preferred dimensions for the rotor blade elements and rotor blades are as follows:

outer shell including rotor blade pressure side and/or rotor blade suction side, spar flange, adhesive angle member: length of 1 m to 150 m, preferably 1.8 m to 80 m and particularly preferably from 3 m to 60 m; greatest width: 0.05 m to 20 m, preferably 0.1 m to 12 m and particularly preferably 0.2 m to 7 m; and limbs: length of 0.2 m to 150 m, preferably 0.5 m to 80 m and particularly preferably 1 m to 50 m; greatest width: 0.01 m to 20 m, preferably 0.03 m to 12 m and particularly preferably 0.05 m to 7 m.

Correspondingly preferred is a rotor blade or rotor blade element in which the surface film is of an area of 0.001 $m^2$ to 3000 $m^2$, preferably 0.003 $m^2$ to 1300 $m^2$ and particularly preferably 0.005 $m^2$ to 500 $m^2$.

In that respect it is quite particularly preferred if the surface film of the rotor blade or rotor blade element is integral and is not composed of a plurality of separate film portions. Insofar therefore as reference is made in this description including the examples and the claims to a surface film, that also always means at least one integral surface film unless otherwise specified in detail.

It is however also a further preferred embodiment of the present invention, to provide a weldable surface film so that the rotor blade or rotor blade element has a plurality of originally individual surface films joined together by welding.

It is preferred if the surface film of the rotor blade or rotor blade element according to embodiments of the invention has a) a mean thickness of 20 to 2500 μm, preferably 30 to 1600 μm and particularly preferably 50 to 1000 μm, and/or b) a minimum thickness of at least 5 μm, preferably at least 10 μm.

Those details are related to the thickness of the surface film after the resin has reacted with the surface film to form the integral rotor blade or rotor blade element. If a deep drawing process is used for production of the rotor blade element or rotor blade according to an embodiment of the invention, as is particularly preferred in accordance with an embodiment of the invention and is described in greater detail hereinafter, the surface film prior to reaction with the resin can be of a greater mean thickness or a greater minimum thickness in order to compensate for losses in thickness caused by the deep drawing operation. Preferably the surface film prior to such a deep drawing operation is of a thickness of 20 to 2500 μm, preferably 30 to 1600 μm and particularly preferably 50 to 1000 μm.

In accordance with embodiments of the invention the mean thickness is the arithmetic mean of the thickness of the surface film at a random sample of locations, that is representative for the rotor blade or rotor blade element. The minimum thickness in turn is the thinnest dimension of the surface film of the respective rotor blade element or rotor blade according to embodiments of the invention.

A surface film suitable for deep drawing is preferably characterized by a stretchability of 0 to 1000%, preferably 50 to 650%. It will be appreciated that the surface film does not have to have any deep-drawing capability for the production of non-curved rotor blade elements.

The surface film (at least prior to the reaction with the resin) is preferably a thermoplastic polymer film. Particularly preferred are films of the following polymers (brief identifications in accordance with DIN 7728 T1) ABS, AMMA, ASA, CA, CAB, EP, EVA, UF, CF, MF, MPF, PF, PAN, PA, PE, HDPE, LDPE, LLDPE, PC, PET, PMMA, PP, PS, SB, PUR, PVC, RF, SAN, PBT, PPE, POM, PP-EPDM and UP (DIN is a standards organization, Deutsches Institut für Normung, and DIN 7728 T1 is a particular standard which provides identifications for the aforelisted polymers). Particularly preferably the surface film is a polyurethane film, polyurethane-ether films being particularly preferred. Polyurethane and in particular corresponding ether films make it possible to set particularly good properties for the surface film as well as the finished rotor blade or rotor blade element. In particular such films are very well stretchable and can be well used in a corresponding fashion in a deep drawing production process as is to be used for rotor blades and rotor blade elements. In addition, such surface films can be produced in micropore-free fashion and retain the freedom from micropores even after a deep drawing step intended for rotor blades and rotor blade elements. That prolongs the service life of a rotor blade or rotor blade element provided with the surface film. Aliphatic surface films are also advantageously resistant to weather and condensation water; as such, selected materials are also UV resistant and they can also protect the subjacent material, in particular the at least partially hardened resin, from UV radiation.

The surface films can be in particular also well weldable and thus facilitate minor repair operations during the operating time or production of the rotor blade or rotor blade element, as occasionally become inevitable, for example, due to the impact of small stones or hail stones. In that respect it is particularly advantageous if such surface films can be weldable using conventional processes. Instead of weldable films it is also possible to use tubular surface films for selected rotor blades and rotor blade elements.

It is also particularly advantageous for wind power installations that polyurethane films can be printed upon, can be colored therethrough or can be durably provided with color so that for example signal markings as are required for reasons of air traffic flight safety can be applied. Corresponding markings are further described hereinafter. The surface films with such film materials and in particular polyurethane surface films have good temperature and weather resistance, they are advantageously free from solvents and/or plasticisers and they preferably have a high level of resistance to abrasion and piercing penetration.

The surface film for rotor blade elements or rotor blades according to embodiments of the invention are preferably incompletely crosslinked or are a pre-polymer prior to the reaction with the resin. The incomplete crosslinking means that the surface film is advantageously suitable for the reaction and for the formation of in particular covalent bonds with the hardenable resin for forming a rotor blade or rotor blade element which is integral in accordance with embodiments of the invention. That can preferably be assisted by the surface film being provided with additional reactive groups, in particular with OH groups, for example by a plasma treatment. By means of plasma treatment and additional reactive groups, it is possible to achieve particularly intimate reaction of the surface film with the resin to form a rotor blade or rotor blade element which is integral in accordance with embodiments of the invention.

The hardenable resin for a rotor blade element according to embodiments of the invention or a rotor blade according to embodiments of the invention is desirably a reaction resin and preferably an epoxy resin. Low-viscosity epoxy resins without solvents or fillers are particularly preferred. Such epoxy resin systems can be preferably be used for processing glass fibers, carbon fibers and/or aramide fibers and are suitable for the production of statically and dynamically highly loaded components such as rotor blades and rotor blade elements.

It will be appreciated that after the reaction with the surface film, to form an integral rotor blade or rotor blade element, the hardenable resin no longer has to be hardenable or no longer has to be substantially further hardenable. The person having ordinary skill in the art interprets the expression "hardenable resin" in connection with the present invention as specifying a fundamental property of the resin and not as a material property which is actually still present in the rotor blade or rotor blade element. After reaction of the resin with the surface film to form the rotor blade or rotor blade element the resin therefore is to be interpreted as hardened unless otherwise stated in detail, in relation to the surface film, as the resin and the surface film have reacted with each other so that they are non-releasably joined together in the manner according to the embodiments of the invention as described in the opening part of this specification. The resin can accordingly also possibly be further hardened after production of a non-releasable connection in accordance with embodiments of the invention, with the surface film, for example in the interior of the resin. That makes it possible for a rotor blade element or rotor blade according to embodiments of the invention to be already removed then from a production mold and for the mold to be loaded for the production of a new rotor blade element or rotor blade before the resin of the rotor blade element or rotor blade just molded in the production mold has completely hardened. It is self-evident to the person having ordinary skill in the art that hardening can be effected in various ways, in particular using a hardener. Insofar as nothing different is stated in this description, the examples and the claims, the expression "hardenable resin" preferably always signifies a resin-hardener system.

The person having ordinary skill in the art can select suitable combinations of surface film materials and resins in the light of this description and the examples. In that respect he can direct himself in particular to DE 10 2006 051 897 A1, the content of which is completely incorporated into the present description by reference thereto.

Particularly preferably the material of the resin and the surface film are matched to each other to achieve an adhesion pull-off force value of at least 1 MPa in accordance with DIN EN ISO 4624, mpreferably at least 5 MPa. DIN, EN and ISO refer to the following standards or standards organizations, respectively: Deutsches Institut für Normung, European Norms/Standards and International Organization for Standardization. Those adhesion pull-off values can be achieved in particular by an epoxy resin and a polyurethane film. Those materials of resin and surface film also make it possible to meet cracking standards in accordance with DIN EN ISO 4628-4 of 0 (S0) and flaking in accordance with DIN EN ISO 4628-5 of 0 (S0). Prior to testing of the properties the respective test body used must be stored for 7 days under standard conditions in accordance with DIN EN 23270(23° C., 50% relative air humidity).

It is also preferred if the surface film has on its side remote from the resin a roughness Rz of a maximum of 8 μm in accordance with DIN EN ISO 42087 and 4288 at a measuring distance of at least 12.5 mm.

A further advantage of polyurethane films is their freedom from pores. That makes it possible to produce particularly smooth and strong rotor blades and rotor blade elements.

The surface film can be transparent or colored. Transparent films make it easier to detect flaws in the connection between the surface film and the hardenable resin. The film can already be colored prior to the reaction with the resin, it can change its color due to or during the reaction or it can be subsequently colored, for example by painting. In addition, the film can be matted or can be made matted after the reaction. Particularly preferred are surface films with a gloss of not more than 30GE("gloss units") in accordance with DIN 67530.

Colored rotor blade elements or surface films are preferably colored in one or more of the colors agate grey RAL 7038, traffic red RAL 3020, traffic orange RAL 2009, traffic white RAL 9016 and flame red RAL 3000. RAL is color matching system and refers to Reichs-Ausschuß für Lieferbedingungen. The rotor blade or rotor blade element can additionally be lacquered or painted on the surface film. A preferred rotor blade or rotor blade element is one whose tip is provided with signal lacquering or painting, particularly preferably signal painting in traffic red RAL 3020, traffic orange RAL 2009 or flame red RAL 3000.

In accordance with embodiments of the invention there is further provided a rotor blade having a rotor blade element according to embodiments of the invention as well as a wind power installation with a rotor blade or rotor blade element according to embodiments of the invention. The wind power installation embodies the advantages which can be achieved with the rotor blade or rotor blade element according to embodiments of the invention.

In accordance with a further aspect of the invention there is further provided a process for the production of a rotor blade or rotor blade element of a wind power installation, including the steps:

a) providing a mold, b) introducing a surface film into the mold, optionally after providing a mold release agent in the mold, c) introducing a molding body, preferably a fiber material, into the mold, optionally introducing further components of the rotor blade or rotor blade element, and/or optionally applying a flow aid for a hardenable resin, d) optionally applying a surface film as a vacuum film, wherein a surface film is introduced or applied in at least one of steps b) and d), and e) infusing the molding body, preferably the fiber material, with a hardenable resin and hardening the resin for the reaction of the surface film and the resin to form a rotor blade or rotor blade element, in which resin and surface film are non-releasably connected together in the sense according to embodiments of the invention.

Embodiments of the invention make it possible to implement the above-described advantages of rotor blades and rotor blade elements for wind power installations described herein. The surface film applied in step d) can perform the function of a conventional vacuum film, but no longer has to be removed after conclusion of the production process, unlike a vacuum film, as it has reacted with the infusion resin and is integrally connected to the rotor blade or rotor blade element.

In accordance with embodiments of the invention there is further provided a repair process for a rotor blade element or rotor blade of a wind power installation, including the steps:

a) providing a fiber material on a rotor blade element or rotor blade, b) covering the fiber material with a surface film, c) optionally providing the fiber material covered with the surface film with a molding body, d) acting on the fiber material with a hardenable resin, and e) reacting the hardenable resin with the surface film.

After the reaction step the hardenable resin and the surface film are non-releasably connected to each other in the sense in accordance with embodiments of the invention, at least in the portion in which they reacted with each other. After the reaction step surface film which possibly projects and which has not reacted can be cut off. The repair process thus also implements the advantages of the above-described production process according to embodiments of the invention.

Step d) can be performed in a preferred repair process prior to step a) so that in step a) a fiber material provided with the hardenable resin is provided. In a further preferred repair process the fiber material is infused after step b) and/or, if present, after step c), with the hardenable resin by the application of a reduced pressure.

The surface film and/or the molding body are provided with a vacuum film prior to step e) in a preferred repair process. The vacuum film is not reacted with the resin to achieve a non-releasable connection. Rather it serves to cover over a region which is as large as possible of the rotor blade element or rotor blade to support the maintenance of a reduced pressure for sucking gas out of the fiber material or to permit same to occur. It is advantageously possible by the use of a vacuum film to keep down the amount of surface film required for maintaining the reduced pressure and in that way to save on material.

Embodiments of the invention have been described hereinbefore with reference to rotor blades for wind power installations and corresponding rotor blade elements; the inventive content thereof is however not limited to those subjects and the described production process. Instead it is also possible for wind power installation pods as preferably fiber-reinforced bodies to be produced and/or repaired with the process according to embodiments of the invention.

Embodiments of the invention are described in greater detail hereinafter with reference to the examples.

EXAMPLE 1

Rotor Blade with Surface Film as a Vacuum Film

In an embodiment of the wind power installation rotor blade according to the invention and the production process thereof a two-part closable rotor blade mold $10_A$, $10_B$ is provided. With reference to FIG. 1, a mold release coating 20 is introduced into the rotor blade mold $10_A$, $10_B$. A glass fiber lay $30_A$ and if required balsa wood shaped bodies and other core materials and insert components are applied to the mold release coating 20. A further layer of glass fiber lay $30_B$ is then applied and flow aids (not shown) for facilitating infusion of the resin into the glass fiber lay $30_A$, $30_B$ and the core materials is arranged. Finally a polyurethane surface film 40 is applied as a vacuum film. The vacuum film serves to maintain a vacuum during the operation of infusion with infusion resin.

Then the mold is closed $10_A$, $10_B$ and evacuated by the application of a suitable vacuum (tried and tested: 0.5 mbar absolute pressure) for sucking in a filler-free, hardener-bearing epoxy resin. The resin is sucked in and infuses the fiber material lay $30_A$, $30_B$, preferably at a resin temperature of about 45° C.

After the infusion step the resin is hardened for about 4 hours. The mold $10_A$, $10_B$ is then opened and the rotor blade removed. The surface film has reacted with the resin and can no longer be detached from the rest of the rotor blade without damage to the surface film and/or the hardenable resin.

The rotor blade can then be surface-treated if desired, for example by being provided with an air traffic flight safety marking.

EXAMPLE 2

Rotor Blade with Surface Film Instead of Mold Release Coating

Figure 2:
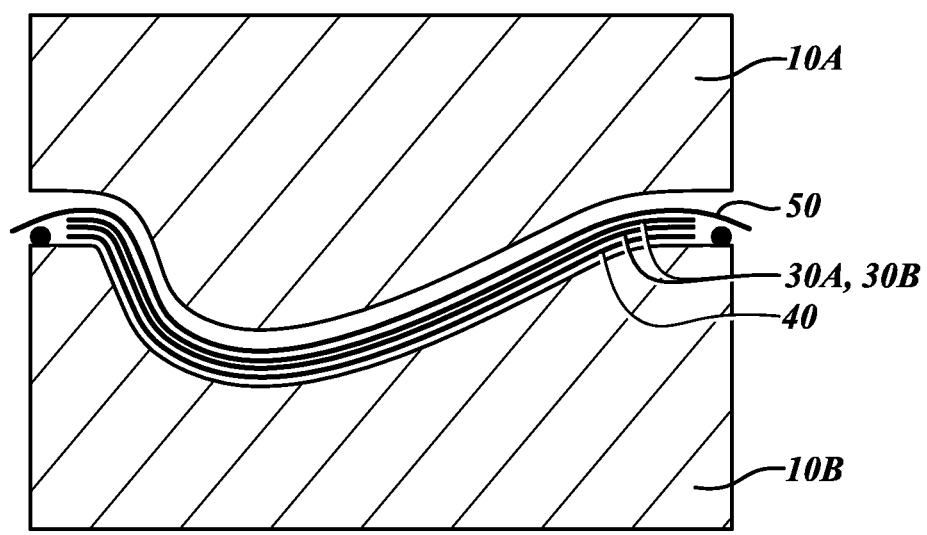
FIG. 2 is a schematic diagram of a rotor blade element formed via a two-part closable rotor blade mold, according to another embodiment.

In a further embodiment there is provided a rotor blade substantially as described in example 1. It will be noted however that after the provision of a two-part closable rotor blade mold $10_A$, $10_B$, a mold release coating is not introduced thereinto. Instead a surface film 40 is placed in the rotor blade mold $10_A$, $10_B$, as shown in FIG. 2. A glass fiber lay $30_A$ is then applied to the surface film 40 as described in example 1 and if required balsa wood shaped bodies and other core materials and insert components. After the application of a further layer of glass fiber lay $30_B$ and after the application of flow aids (not shown) a polyurethane surface film 50 is applied, as a vacuum film. Then as described in example 1 an epoxy infusion resin is infused, hardened and the rotor blade is removed and optionally subjected to surface treatment. The surface film has reacted with the resin and can no longer be detached from the rest of the rotor blade without damage to the surface film and/or the hardenable resin.

EXAMPLE 3

Repair Process with Resin Infusion

A rotor blade having a damaged surface region is provided. The damaged surface region is removed so that a recess is produced in the rotor blade, in place of the damaged surface region. A glass fiber lay is introduced into the recess. Flow aids for facilitating infusion of the fiber material lay are then arranged. The fiber material lay is covered with a polyurethane surface film. A shaping body is applied to the surface film to reproduce the original undamaged surface contour of the rotor blade in the damaged surface region and to provide a smooth surface. A vacuum film is applied to the surface film and the shaping body to assist with maintaining a reduced pressure in the infusion operation and to press the shaping body against the rotor blade surface. An epoxy resin is infused into the glass fiber lay by the application of a reduced pressure and by sucking gas out of the glass fiber lay. The resin is at least partially hardened so that it reacts with the surface film where the resin and the surface film come into contact with each other in order there to provide a connection between the surface film and the hardenable resin, that is non-releasable in the sense according to embodiments of the invention. The vacuum film and the shaping body are then removed and, if necessary, the surface film which is not joined to the resin is cut off. That affords a rotor blade surface which has been restored with a true contour to the original undamaged surface and which if required can be painted.

EXAMPLE 4

Repair Process with Resin Suction Removal

As described in example 3 a recess is produced in a rotor blade at a damaged location to remove the damaged location. Unlike example 3 a glass fiber lay is introduced into the resin, the glass fiber already being impregnated with an excess of hardenable resin. The following procedure is then as described in example 3 so that upon application of the reduced pressure excess resin is expelled from the glass fiber lay. After at least partial hardening of the resin that gives a rotor blade surface which is restored with a contour true to the original undamaged surface and which if required can be painted.

The various embodiments described above can be combined to provide further embodiments. All of the U.S. patents, U.S. patent application publications, U.S. patent application, foreign patents, foreign patent application and non-patent publications referred to in this specification and/or listed in the Application Data Sheet are incorporated herein by reference, in their entirety. Aspects of the embodiments can be modified, if necessary to employ concepts of the various patents, application and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A repair process for a rotor blade element of a wind power installation, the process comprising:
   providing a fiber material at the rotor blade element;
   covering the fiber material with a surface film;
   drawing gas out of the fiber material;
   acting on the fiber material with a hardenable resin; and
   reacting the hardenable resin with the surface film.

2. A repair process according to claim 1 wherein the surface film is provided with a vacuum film prior to acting on the fiber material with the hardenable resin.

3. A process according to claim 1, further comprising:
   providing the fiber material covered with the surface film with a molding body.

4. A process according to claim 3 wherein the molding body is provided with a vacuum film prior to acting on the fiber material with the hardenable resin.

* * * * *